United States Patent
Heim et al.

(10) Patent No.: US 11,729,537 B2
(45) Date of Patent: Aug. 15, 2023

(54) VARIABLE ANGLE TRANSDUCER INTERFACE BLOCK

(71) Applicant: PERCEPTIVE SENSOR TECHNOLOGIES, INC., Tucson, AZ (US)

(72) Inventors: James M. Heim, Tucson, AZ (US); William Coleman, Tucson, AZ (US); Lazar Bivolarsky, Cupertino, CA (US); Joel D. Burcham, Huntsville, AL (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/541,036

(22) Filed: Dec. 2, 2021

(65) Prior Publication Data

US 2022/0174380 A1    Jun. 2, 2022

Related U.S. Application Data (60) Provisional application No. 63/120,602, filed on Dec. 2, 2020.

(51) Int. Cl.
*H04R 1/02* (2006.01)
*H04R 1/32* (2006.01)
*G01N 29/24* (2006.01)

(52) U.S. Cl.
CPC .............. *H04R 1/02* (2013.01); *H04R 1/32* (2013.01); *G01N 29/2487* (2013.01)

(58) Field of Classification Search
CPC ......... H04R 1/02; H04R 1/32; G01N 29/2487
See application file for complete search history.

(56) References Cited

U.S. PATENT DOCUMENTS

| 2,449,054 A | 9/1948 | Chantlin ..................... 177/311 |
| 3,019,650 A | 2/1962 | Worswick ...................... 73/290 |
| 3,703,829 A | 11/1972 | Dougherty ..................... 73/290 |

(Continued)

FOREIGN PATENT DOCUMENTS

| CN | 204944617 | 1/2016 | .......... G01F 23/296 |
| CN | 105333925 | 2/2016 | .......... G01F 23/296 |

(Continued)

OTHER PUBLICATIONS

Amjad, Umar et al, "Advanced signal processing technique for damage detection in steel tubes" Proceedings of SPIE, Health Monitoring of Structural and Biological Systems, 2016, 980511 (Apr. 1, 2016);14 pgs.

(Continued)

*Primary Examiner* — Oyesola C Ojo
(74) *Attorney, Agent, or Firm* — Hayes Soloway P.C.

(57) ABSTRACT

A variable angle transducer interface block apparatus and related systems and methods are disclosed. The variable angle transducer interface block apparatus has an interface block having a mounting receiver. The interface block is positioned proximate to a material wall. A curved mounting structure is movably connected to the mounting receiver. A transducer is mounted on the curved mounting structure, wherein an angle of an acoustic signal transmitted by the transducer into the material wall is adjustable by movement of the curved mounting structure relative to the mounting receiver.

13 Claims, 8 Drawing Sheets

(56) References Cited

U.S. PATENT DOCUMENTS

| | | | |
|---|---|---|---|
| 3,837,218 A | 9/1974 | Flambard et al. | G01N 29/00 |
| 3,971,962 A | 7/1976 | Green | H01L 41/08 |
| 4,065,958 A | 1/1978 | Krylova et al. | G01N 29/02 |
| 4,118,983 A | 10/1978 | Braznikov | G01F 23/28 |
| 4,121,468 A | 10/1978 | Glover et al. | G01N 29/04 |
| 4,182,177 A | 1/1980 | Prough | 73/290 |
| 4,280,126 A | 7/1981 | White | 340/621 |
| 4,320,659 A | 3/1982 | Lynnworth et al. | G01N 29/02 |
| 4,326,173 A | 4/1982 | Newman | |
| 4,501,146 A | 2/1985 | Greenhalgh | G01F 23/28 |
| 4,580,448 A | 4/1986 | Skrgatic | G01F 23/28 |
| 4,596,266 A | 6/1986 | Kinghom et al. | B65D 88/38 |
| 4,599,892 A | 7/1986 | Doshi | G91F 17/00 |
| 4,676,098 A | 6/1987 | Erlenkämper et al. | 73/290 |
| 4,852,416 A * | 8/1989 | Boone | G01N 29/223 |
| | | | 73/431 |
| 4,934,191 A | 6/1990 | Kroening et al. | 73/592 |
| 4,954,997 A | 9/1990 | Dieulesaint et al. | G08B 21/00 |
| 4,977,780 A * | 12/1990 | Machida | G10K 11/02 |
| | | | 73/644 |
| 5,015,995 A | 5/1991 | Holroyd | 340/621 |
| 5,038,611 A | 8/1991 | Weldon et al. | 73/290 |
| 5,040,415 A | 8/1991 | Barkhoudarian | G01F 1/66 |
| 5,148,700 A | 9/1992 | King | G01N 15/00 |
| 5,195,058 A | 3/1993 | Simon | G01S 15/02 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,453,944 A | 9/1995 | Baumoel | G06F 17/00 |
| 5,460,046 A | 10/1995 | Maltby et al. | G01N 29/24 |
| 5,469,749 A | 11/1995 | Shimada et al. | G01F 1/38 |
| 5,604,314 A * | 2/1997 | Grahn | G01L 1/255 |
| | | | 73/862.541 |
| 5,770,806 A | 6/1998 | Hiismaki | G01F 1/662 |
| 5,821,427 A | 10/1998 | Byrd | G01F 1/66 |
| 5,836,192 A | 11/1998 | Getman et al. | G01F 23/28 |
| 6,035,903 A | 3/2000 | Few et al. | B65B 1/04 |
| 6,151,956 A | 11/2000 | Takahashi et al. | G01N 3/56 |
| 6,157,894 A | 12/2000 | Hess et al. | 702/54 |
| 6,192,751 B1 | 2/2001 | Stein et al. | G08B 21/00 |
| 6,330,831 B1 | 12/2001 | Lynnworth et al. | 73/861.28 |
| 6,354,147 B1 | 3/2002 | Gysling et al. | G01N 29/00 |
| 6,368,281 B1 * | 4/2002 | Solomon | G10K 11/02 |
| | | | 600/459 |
| 6,443,006 B1 | 9/2002 | Degrave | G02F 23/00 |
| 6,470,744 B1 | 10/2002 | Usui et al. | 73/290 |
| 6,481,287 B1 | 11/2002 | Ashworth et al. | G01K 11/24 |
| 6,513,385 B1 | 2/2003 | Han | G01N 29/00 |
| 6,575,043 B1 | 6/2003 | Huang et al. | G01F 1/66 |
| 6,578,424 B1 * | 6/2003 | Ziola | G01N 29/225 |
| | | | 73/632 |
| 6,631,639 B1 | 10/2003 | Dam et al. | 73/290 |
| 6,672,163 B2 | 1/2004 | Han et al. | G01V 1/28 |
| 6,691,582 B1 | 2/2004 | Nawa et al. | G01F 1/66 |
| 6,836,734 B2 | 12/2004 | Rojas et al. | G06F 19/00 |
| 6,925,868 B2 | 8/2005 | Young et al. | 73/290 |
| 6,938,488 B2 | 9/2005 | Diaz et al. | 73/597 |
| 7,085,391 B1 * | 8/2006 | Yamaya | G10H 1/32 |
| | | | 381/118 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,359,803 B2 | 4/2008 | Gysling et al. | G01N 31/00 |
| 7,363,174 B2 | 4/2008 | Kishiro et al. | G01F 25/10 |
| 7,430,924 B2 | 10/2008 | Gysling et al. | G01F 1/00 |
| 7,437,946 B2 | 10/2008 | Gysling | G01F 1/22 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,757,560 B2 | 7/2010 | Hofmann | G01R 33/20 |
| 7,962,293 B2 | 6/2011 | Gysling | G01F 1/76 |
| 7,966,882 B2 | 6/2011 | Greenwood | 73/597 |
| 8,249,829 B2 | 8/2012 | Vass et al. | G06F 19/00 |
| 8,346,491 B2 | 1/2013 | Loose et al. | G01F 1/00 |
| 8,482,295 B2 | 7/2013 | Sadri et al. | G01R 27/04 |
| 8,683,882 B2 * | 4/2014 | Jackson | G01N 29/265 |
| | | | 73/866.5 |
| 8,820,182 B2 | 9/2014 | Nikolay Nikolov et al. | H04Q 9/00 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,383,476 B2 | 7/2016 | Trehan et al. | G01V 11/00 |
| 9,557,208 B2 | 1/2017 | Kuroda et al. | G01F 23/28 |
| 9,772,311 B2 | 9/2017 | Liljenberg et al. | G01N 29/032 |
| 9,816,848 B2 | 11/2017 | Raykhman et al. | G01F 1/86 |
| 9,891,085 B2 | 2/2018 | Muhammad et al. | G01F 1/88 |
| 10,122,051 B2 | 11/2018 | Kuhne et al. | H01M 10/484 |
| 10,458,871 B2 | 10/2019 | Norli | G01L 11/04 |
| 10,794,871 B1 * | 10/2020 | Blackshire | G01N 29/265 |
| 11,020,793 B2 | 6/2021 | De Monte et al. | B22D 2/006 |
| 11,047,721 B2 | 6/2021 | Schöb et al. | G01F 1/66 |
| 11,274,952 B2 | 3/2022 | Bober et al. | G01F 1/66 |
| 11,293,791 B2 | 4/2022 | Firouzi et al. | G01F 1/66 |
| 11,536,696 B2 | 12/2022 | Bivolarsky et al. | |
| 2002/0170753 A1 | 11/2002 | Clare | G01G 19/22 |
| 2002/0173230 A1 | 11/2002 | Mayes | B24B 49/00 |
| 2004/0035208 A1 | 2/2004 | Diaz et al. | G01N 29/18 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0001028 A1 | 1/2007 | Gysling | B05B 7/30 |
| 2007/0068248 A1 | 3/2007 | Freger et al. | G01F 23/28 |
| 2007/0068253 A1 * | 3/2007 | Carodiskey | G01N 29/262 |
| | | | 600/473 |
| 2007/0157737 A1 | 7/2007 | Gysling et al. | G01F 1/667 |
| 2007/0205907 A1 | 9/2007 | Schenk, Jr. | G08B 21/00 |
| 2008/0092623 A1 | 4/2008 | Lynch et al. | G01N 29/02 |
| 2008/0101158 A1 | 5/2008 | Hosseini et al. | G01S 15/00 |
| 2009/0143681 A1 | 6/2009 | Jurvelin et al. | A61B 8/00 |
| 2010/0111133 A1 | 5/2010 | Yuhas et al. | G01K 17/00 |
| 2010/0199779 A1 | 8/2010 | Liu et al. | G01F 1/663 |
| 2010/0218599 A1 | 9/2010 | Young et al. | G01F 23/296 |
| 2010/0242593 A1 | 9/2010 | Lagergren et al. | G01F 23/296 |
| 2011/0029262 A1 | 2/2011 | Barkhouse | 702/55 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 * | 2/2012 | Oberdoerfer | G01N 29/4463 |
| | | | 73/632 |
| 2012/0055239 A1 | 3/2012 | Sinha | G01N 29/00 |
| 2012/0173169 A1 | 7/2012 | Skelding | G06F 19/00 |
| 2012/0222471 A1 | 9/2012 | Raykhman et al. | G01N 29/02 |
| 2012/0259560 A1 | 10/2012 | Woltring et al. | 702/55 |
| 2012/0262472 A1 | 10/2012 | Garr et al. | G06T 11/206 |
| 2012/0265454 A1 | 10/2012 | Rudd et al. | G01F 1/66 |
| 2012/0281096 A1 | 11/2012 | Gellaboina et al. | G01S 15/89 |
| 2013/0002443 A1 | 1/2013 | Breed et al. | G08B 21/00 |
| 2013/0068027 A1 | 3/2013 | Sullivan et al. | G01N 29/04 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 * | 4/2014 | Sharf | A61B 5/25 |
| | | | 600/300 |
| 2014/0223992 A1 | 8/2014 | Harper et al. | G01F 25/0084 |
| 2014/0301902 A1 | 10/2014 | Fernald et al. | B01J 19/10 |
| 2014/0375169 A1 * | 12/2014 | Na | G01N 29/28 |
| | | | 181/175 |

(56) References Cited

U.S. PATENT DOCUMENTS

| | | | |
|---|---|---|---|
| 2015/0075278 A1 | 3/2015 | Dockendorff et al. | G01F 23/296 |
| 2015/0198471 A1 | 7/2015 | Furlong et al. | G01F 1/66 |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/284 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0146653 A1 | 5/2016 | Skelding | E21B 21/01 |
| 2016/0169839 A1 | 6/2016 | Gottlieb et al. | G01N 29/22 |
| 2016/0216141 A1 | 7/2016 | Leaders et al. | G01F 1/66 |
| 2016/0265954 A1 | 9/2016 | Bachmann et al. | G01F 1/667 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/296 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0102095 A1 | 4/2017 | Kunita et al. | F16K 37/0091 |
| 2017/0097322 A1 | 6/2017 | Giese et al. | G01N 29/07 |
| 2017/0199295 A1 | 7/2017 | Mandal | G01V 1/50 |
| 2017/0202595 A1 | 7/2017 | Shelton, IV | A61B 18/00 |
| 2017/0239741 A1 | 8/2017 | Furuta | B23H 1/10 |
| 2017/0268915 A1 | 9/2017 | Gestner et al. | G01F 1/66 |
| 2017/0309989 A1 | 10/2017 | Waelde et al. | H01Q 1/225 |
| 2018/0035603 A1 | 2/2018 | Kremmer et al. | A01C 7/20 |
| 2018/0044159 A1 | 2/2018 | Crouse et al. | B67D 1/0406 |
| 2018/0080809 A1 | 3/2018 | Tokarev et al. | G01F 23/2965 |
| 2018/0113663 A1 | 4/2018 | Jain | |
| 2018/0149505 A1 | 5/2018 | Ploss et al. | G01F 1/66 |
| 2018/0266874 A1 | 9/2018 | Montoya et al. | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1* | 12/2018 | Lee | G01N 29/26 |
| 2019/0011304 A1 | 1/2019 | Cunningham et al. | G01F 17/00 |
| 2019/0063984 A1 | 2/2019 | Bowley | G01F 23/2962 |
| 2019/0078927 A1 | 3/2019 | Takayama et al. | G01F 23/2965 |
| 2019/0137310 A1* | 5/2019 | Xiao | G01F 1/667 |
| 2019/0154480 A1 | 5/2019 | Schöb et al. | G01F 1/662 |
| 2019/0195629 A1 | 6/2019 | Vaissiere | G01C 9/00 |
| 2019/0195830 A1 | 6/2019 | Tamura et al. | |
| 2019/0272496 A1 | 9/2019 | Moeller | G06Q 10/087 |
| 2019/0368908 A1 | 12/2019 | Aughton et al. | G01F 1/66 |
| 2020/0018628 A1 | 1/2020 | Head et al. | G21C 17/022 |
| 2020/0182736 A1 | 6/2020 | Kim et al. | G01M 3/2807 |
| 2020/0195449 A1 | 6/2020 | Obaidi | |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1* | 12/2021 | Xu | G01N 29/2487 |
| 2022/0034850 A1 | 2/2022 | Zhang et al. | G01N 29/22 |
| 2022/0178879 A1 | 6/2022 | Bivolarsky et al. | G02N 29/028 |
| 2022/0178881 A1 | 6/2022 | Bivolarsky et al. | G01N 29/04 |

FOREIGN PATENT DOCUMENTS

| | | | |
|---|---|---|---|
| CN | 105548370 | 5/2016 | G01N 29/24 |
| CN | 105548370 A * | 5/2016 | G01N 29/24 |
| DE | 10 2010 029 254 | 12/2011 | F01N 3/10 |
| EP | 2450701 | 5/2012 | G01N 29/22 |
| EP | 2962096 | 8/2019 | G01L 1/255 |
| GB | 2192717 | 1/1990 | G01N 29/00 |
| JP | 2000314651 | 11/2000 | G01F 23/28 |
| JP | 2013140029 | 7/2013 | F01K 5/02 |
| KR | 200174618 | 3/2000 | G01N 29/24 |
| KR | 200174618 Y1 * | 3/2000 | G01N 29/2487 |
| WO | WO 87/04793 | 8/1987 | G01N 29/00 |
| WO | WO-8809895 A1 * | 12/1988 | G01N 29/223 |
| WO | WO9010849 | 9/1990 | G01F 23/28 |
| WO | WO 2007/149605 | 12/2007 | |
| WO | WO2008079202 | 7/2008 | G01F 3/36 |
| WO | WO 2014/167471 | 10/2014 | G01F 23/30 |
| WO | WO 2020/136945 | 7/2020 | G01F 23/296 |

OTHER PUBLICATIONS

Amjad, Umar et al. "Change in time-of-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasoncis* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring* 2015, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" *Houston Chronicle*, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" *International Congress on Ultrasonics* AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

Examination Report No. 1 issued in Australian Application No. 2020283140 dated Jan. 4, 2022, 6 pgs.

International Search Report and Written Opinion issued in PCT/US20/35404, dated Aug. 24, 2020, 11 pages.

Examination Report No. 1 issued in Australian Patent Application No. 2020302919, dated Feb. 15, 2022, 4 pgs.

International Search Report and Written Opinion issued in PCT/US20/39966, dated Sep. 18, 2020, 13 pages.

International Preliminary Report on Patentability issued in PCT/US20/35404 dated Nov. 16, 2021, 8 pgs.

International Preliminary Report on Patentability issued in PCT/US20/39966 dated Dec. 28, 2021, 10 pgs.

(56) References Cited

OTHER PUBLICATIONS

Notice of Allowance issued in Application U.S. Appl. No. 16/888,469, dated Dec. 23, 2020, 16 pgs.
Notice of Allowance issued in Application U.S. Appl. No. 17/148,122 dated Jun. 16, 2021, 8 pgs.
Notice of Allowance issued in Application U.S. Appl. No. 16/914,092 dated Oct. 28, 2021, 14 pgs.
Office Action issued in Canadian Patent Application No. 3,140,008, dated Feb. 14, 2022, 4 pgs.
Office Action issued in Application U.S. Appl. No. 16/888,469, dated Aug. 5, 2020, 8 pages.
Office Action issued in Application U.S. Appl. No. 16/888,469, dated Sep. 8, 2020, 20 pages.
Office Action issued in Application U.S. Appl. No. 16/914,092, dated Nov. 10, 2020, 22 pgs.
Office Action issued in Application U.S. Appl. No. 16/914,092, dated Mar. 1, 2021, 25 pgs.
Office Action issued in Application U.S. Appl. No. 16/914,092, dated Jun. 24, 2021, 24 pgs.
Office Action issued in Application U.S. Appl. No. 17/148,122, dated Mar. 2, 2021, 26 pgs.
U.S. Appl. No. 17/543,152, filed Dec. 6, 2021, Bivolarsky et al.
U.S. Appl. No. 17/542,461, filed Dec. 5, 2021, Bivolarsky et al.
International Search Report and Written Opinion issued in PCT/US21/61962 dated Feb. 16, 2022, 9 pgs.
International Search Report and Written Opinion issued in PCT/US21/61924 dated Feb. 16, 2022, 9 pgs.
International Search Report and Written Opinion issued in PCT/US21/62010 dated Feb. 16, 2022, 9 pgs.
International Search Report and Written Opinion issued in PCT/US21/61970 dated Feb. 18, 2022, 17 pgs.
International Search Report and Written Opinion issued in PCT/US21/61925 dated Feb. 18, 2022, 9 pgs.
International Search Report and Written Opinion issued in PCT/US21/61646 dated Feb. 25, 2022, 9 pgs.
International Search Report and Written Opinion issued in PCT/US21/65664 dated Mar. 11, 2022, 9 pgs.
International Search Report and Written Opinion issued in PCT/US21/62001 dated Mar. 9, 2022, 9 pgs.
International Search Report and Written Opinion issued in PCT/US21/61926 dated Mar. 8, 2022, 9 pgs.
Notice of Acceptance issued in Australian Application No. 2020302919 dated Mar. 2, 2022, 4 pgs.
Notice of Acceptance issued in Australian Application No. 2020283140 dated Mar. 30, 2022, 4 pgs.
Notice of Allowance issued in Canadian Application No. 3,140,008 dated May 5, 2022, 1 pg.
Office Action issued in Australian Patent Application No. 2020283140, dated Mar. 18, 2022, 5 pgs.
Office Action issued in Application U.S. Appl. No. 17/543,200, dated Mar. 9, 2022, 8 pages.
Office Action issued in Application U.S. Appl. No. 17/542,461, dated Mar. 10, 2022, 18 pages.
Office Action issued in Application U.S. Appl. No. 17/542,465, dated Mar. 11, 2022, 22 pages.
Office Action issued in Application U.S. Appl. No. 17/542,872, dated Mar. 17, 2022, 21 pages.
Office Action issued in Application U.S. Appl. No. 17/566,020, dated Mar. 18, 2022, 20 pages.
Office Action issued in Application U.S. Appl. No. 17/543,152, dated Apr. 19, 2022, 17 pages.
Office Action issued in Application U.S. Appl. No. 17/542,814, dated Apr. 25, 2022, 21 pages.
Vermeersch, "Influence of substrate thickness on thermal impedance of microelectronic structures", Microelectronics Reliability, 47, 2007, pp. 437-443.
U.S. Appl. No. 17/540,021, filed Dec. 1, 2021, Heim et al.
U.S. Appl. No. 17/543,152, filed Dec. 3, 2021, Bivolarsky et al.
U.S. Appl. No. 17/542,814, filed Dec. 6, 2021, Bivolarsky et al.
U.S. Appl. No. 17/542,461, filed Dec. 5, 2021, Burcham et al.
U.S. Appl. No. 17/542,465, filed Dec. 5, 2021, Bivolarsky et al.
U.S. Appl. No. 17/542,872, filed Dec. 6, 2021, Bivolarsky et al.
U.S. Appl. No. 17/543,200, filed Dec. 6, 2021, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.
U.S. Appl. No. 17/746,622, filed May 17, 2021, Bivolarsky et al.
U.S. Appl. No. 17/746,640, filed May 17, 2021, Bivolarsky et al.
Office Action issued in U.S. Appl. No. 17/542,462, dated May 27, 2022, 28 pages.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/746,640, dated Aug. 18, 2022, 19 pages.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Notice of Allowance issued in U.S. Appl. No. 17/543,152, dated Jul. 29, 2022, 16 pages.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Office Action issued in U.S. Appl. No. 17/542,462, dated Nov. 14, 2022, 11 pgs.
Office Action issued in U.S. Appl. No. 17/566,020, dated Nov. 14, 2022, 21 pgs.
Notice of Allowance issued in U.S. Appl. No. 17/542,461, dated Oct. 12, 2022, 9 pages.
Notice of Allowance issued in U.S. Appl. No. 17/543,200, dated Nov. 3, 2022, 16 pages.
Notice of Allowance issued in U.S. Appl. No. 17/746,622, dated Nov. 8, 2022, 16 pages.
Notice of Allowance issued in U.S. Appl. No. 17/540,021, dated Mar. 6, 2023, 10 pgs.
Office Action issued in U.S. Appl. No. 17/542,462, dated Mar. 17, 2023, 11 pgs.
Office Action issued in U.S. Appl. No. 17/566,020, dated Apr. 3, 2023, 20 pgs.
Office Action issued in U.S. Appl. No. 17/542,814, dated Apr. 6, 2023, 17 pgs.
Supplementary Partial EP Search Report issued in EP20 813 097,1, dated Jan. 13, 2023, 16 pgs.
Office Action issued in U.S. Appl. No. 18/109,022, dated Feb. 13, 2023, 18 pgs.
International Search Report and Written Opinion issued in PCT/US23/12923 dated May 3, 2023, 9 pgs.
Supplementary European Search Report issued in EP Application No. 20 813 097.1, dated May 24, 2023, 20 pgs.
Office Action issued in U.S. Appl. No. 18/111,376, dated Jun. 15, 2023, 28 pgs.
Supplementary Partial European Search Report issued in EP Application No. 20 832 739.5, dated May 25, 2023, 16 pgs.

* cited by examiner

VARIABLE ANGLE TRANSDUCER INTERFACE BLOCK

CROSS REFERENCE TO RELATED APPLICATION

This application claims benefit of U.S. Provisional Application Ser. No. 63/120,602 filed Dec. 2, 2020 and titled "Variable Angle Transducer Interface Block", the entire disclosure of which is incorporated herein by reference.

FIELD OF THE DISCLOSURE

The present disclosure is generally related to acoustic transducer mounts and more particularly is related to a variable angle transducer interface block.

BACKGROUND OF THE DISCLOSURE

Acoustic transducers pass a sound wave into a material. The material can be gas, liquid or air, or some combination thereof. The sound waves are typically longitudinal, shear, or surface waves, and the acoustic waves reflect, refract or transmit at impedance boundaries. These boundaries usually occur when there are material changes along the path of the wave, such as a vessel wall containing a liquid material. When an acoustic wave propagates perpendicularly to an impedance boundary, then the wave may only reflect or transmit through the boundary. However, the environment gets much more complex when a wave contacts an impedance boundary at an angle. This complexity provides a wide variety of information back to a user. For example, the wave may refract, convert to a shear wave, convert to a surface wave, transmit at a new angle, or reflect.

When a return acoustic signal is analyzed, a user needs to ensure the wave traveled as expected in a material. This requires that the signal is inserted into the material at a fixed angle. Currently, acoustic waves are inserted into a material using fixed angle wedges. If a wedge angle is not correct for a desired analysis, then a user has limited options to insert the signal into the material.

Thus, a heretofore unaddressed need exists in the industry to address the aforementioned deficiencies and inadequacies.

SUMMARY OF THE DISCLOSURE

Embodiments of the present disclosure provide an apparatus, a system, and methods for variable angle transducer interface block. Briefly described, in architecture, one embodiment of the apparatus, among others, can be implemented as follows. The variable angle transducer interface block apparatus has an interface block having a mounting receiver. The interface block is positioned proximate to a material wall. A curved mounting structure is movably connected to the mounting receiver. A transducer is mounted on the curved mounting structure, wherein an angle of an acoustic signal transmitted by the transducer into the material wall is adjustable by movement of the curved mounting structure relative to the mounting receiver.

The present disclosure can also be viewed as providing methods of adjusting a propagation angle of an acoustic signal through a material. In this regard, one embodiment of such a method, among others, can be broadly summarized by the following steps: providing a transducer mounted on a curved mounting structure, the curved mounting structure movably connected to a mounting receiver of an interface block; positioning the interface block proximate to a material wall; transmitting, with the transducer, an initial acoustic signal through the interface block and the material wall, the initial acoustic signal having an initial propagation angle and an initial material propagation angle; determining the initial material propagation angle; rotating the transducer and the curved mounting structure within the mounting receiver; and transmitting, with the transducer, a subsequent acoustic signal through the interface block and the material wall, the subsequent acoustic signal having a subsequent material propagation angle different from the initial material propagation angle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve upon the conventional devices used within the industry, the subject disclosure is directed to a variable angle transducer interface block which allows a transducer to have an easily variable angle relative to a material. While fixed angle wedges can be used for transmitting the acoustic signal in static positions at a given time, they have many shortcomings when the angle of transmission of the acoustic signal needs to be adjusted. For example, it is common for the desired angle of transmission to be varied depending on the material thickness, acoustic velocity in the material, impedance barrier, and similar criteria, such as temperature or density, where adjusting the angle of the transducer could be due to changes in temperature, which can change the density. The variable angle transducer interface block described herein is a device that allows a user to send an acoustic signal into a material at a variety of angles, which allows for detailed investigation of particles flowing through a material.

Figure 1:
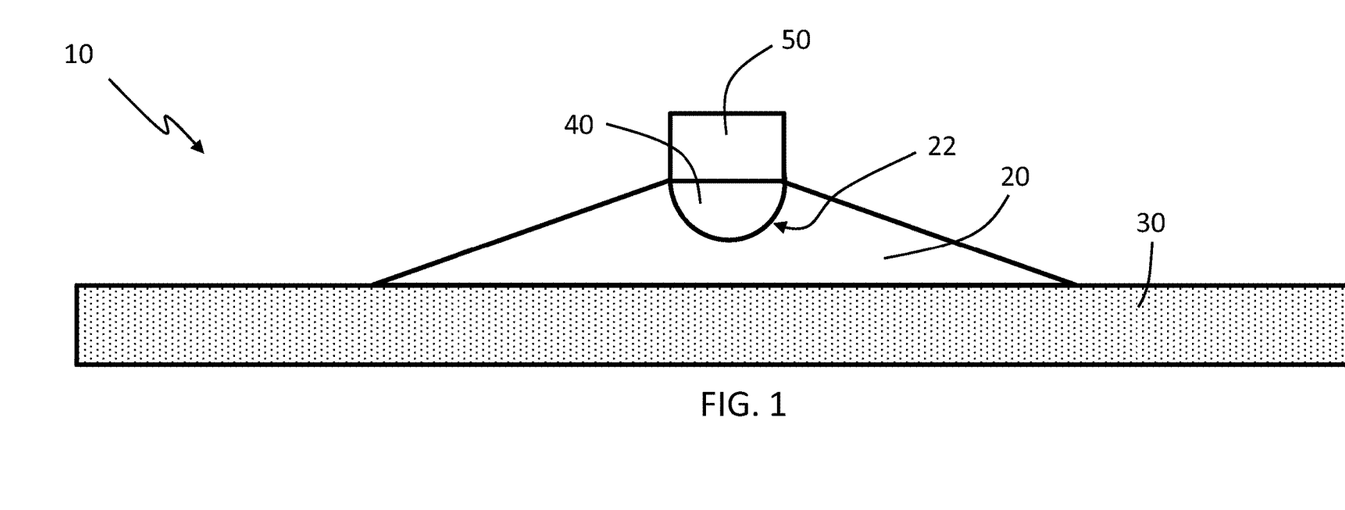
FIG. 1 is a cross-sectional illustration of a variable angle transducer interface block apparatus, in accordance with a first exemplary embodiment of the present disclosure.

FIG. 1 is a cross-sectional illustration of a variable angle transducer interface block apparatus 10, in accordance with a first exemplary embodiment of the present disclosure. The variable angle transducer interface block apparatus 10, which may be referred to simply as 'apparatus 10', includes an interface block 20 having a mounting receiver 22. The interface block 20 is positioned proximate to a material wall 30. A curved mounting structure 40 is movably connected to the mounting receiver 22. A transducer 50 is mounted on the curved mounting structure 40, wherein an angle of an acoustic signal transmitted by the transducer 50 into the material wall 30 is adjustable by movement of the curved mounting structure 40 relative to the mounting receiver 22. As can be understood from FIG. 1, the apparatus 10 allows for mounting the transducer 50 to a material wall 30 in a way which allows the angular position of a signal emitted by the transducer 50 to be adjusted relative to the material wall 30. The wall 30 may include any shape, including flat or planar shapes, curved shapes, or other environmental conditions having material properties or shapes. In one example, the interface block 20 is a truncated pyramid or truncated circular pyramid, i.e., a truncated cone structure which is positioned connected to or proximate to the material wall 30, with flat or curved base matching the surface of the material wall 30 shape of the container in the place of attachment. The base or wide end of the interface block 20 is positioned near the material wall 30 while the narrow end or top of the interface block 20 is positioned distal from the material wall 30. The walls between the base and the top of the interface block 20 may be pitched at any suitable angle, giving the base any desired surface area. In one example, the walls may be pitched at a 65° angle relative to the normal position of the base of the interface block 20. Within the top of the interface block 20 is the mounting receiver 22, which in FIG. 1, is depicted as a hemispherical cavity which receives a correspondingly shaped hemispherical curved mounting structure 40. In one example, the transducer 50 may cover only small part of mounting structure 40 such that it can achieve wide angle range. In another example, the transducer 50 may have a wider base which can receive a signal from a larger area, thereby catching more of the reflected signal from the material wall 30 that is measured or the opposite wall of the container. This may increase its measurement capabilities, like accuracy and sensitivity, and others including measuring signals that are completely missed by relaying on the smaller base of the transduce 50 face, since it will effectively serve as an antenna.

The mated shapes of the curved mounting structure 40 and the mounting receiver 22 may include any type of shapes, such as true hemispherical, semi-hemispherical such as more or less than a hemisphere, curved, arched, or similar, including half pipe or half cylinder. In one example, the curved mounting structure 40 may have a volume and shape greater than a hemisphere but less than a whole sphere. The transducer 50 is then mounted to the exterior of the curved mounting structure 40, such that when the curved mounting structure 40 is angularly moved relative to the interface block 20, the angular orientation of the transducer 50 is adjusted. Additionally, the curved mounting structure 40 and the mounting receiver 22 may be manufactured from various materials, which may be adjusted for each application, such as to accommodate an expected temperature range or the measured material properties.

The interface block 20 and the curved mounting structure 40 may be made from any materials having suitable acoustic impedances for transmission of the acoustic signal into the material wall 30. This may include a single material for the interface block 20 and the curved mounting structure 40, a different material for each component, a combination of materials making up the interface block 20 or the curved mounting structure 40, and the like. For example, the material forming the interface block 20 can be formed from metals or non-metal materials, like glass, plastic, and the like. Similar, it is noted that the material wall 30 may be formed from any metal or non-metal material, and the material within the container having the wall 30 can include any substance, including fluids, liquids, gasses, solids, etc. When the material is a petroleum product, the detected material therein may include a sludge, paraffins, or sand gels.

The interface block 20 may have a first acoustic impedance, and the curved mounting structure 40 may have a second acoustic impedance. In one example, the interface block 20 and the curved mounting structure 40 may have the same acoustic impedance characteristics, i.e., may be made from the same material or from different materials having the same acoustic characteristics. In another example, the first and second acoustic impedances may be different from one another; for instance, the interface block 20 may have a higher impedance than the curved mounting structure 40, or vice-versa. In another example, the first and second acoustic impedances may differ from the acoustic impedance characteristics of the material wall.

Figure 2:
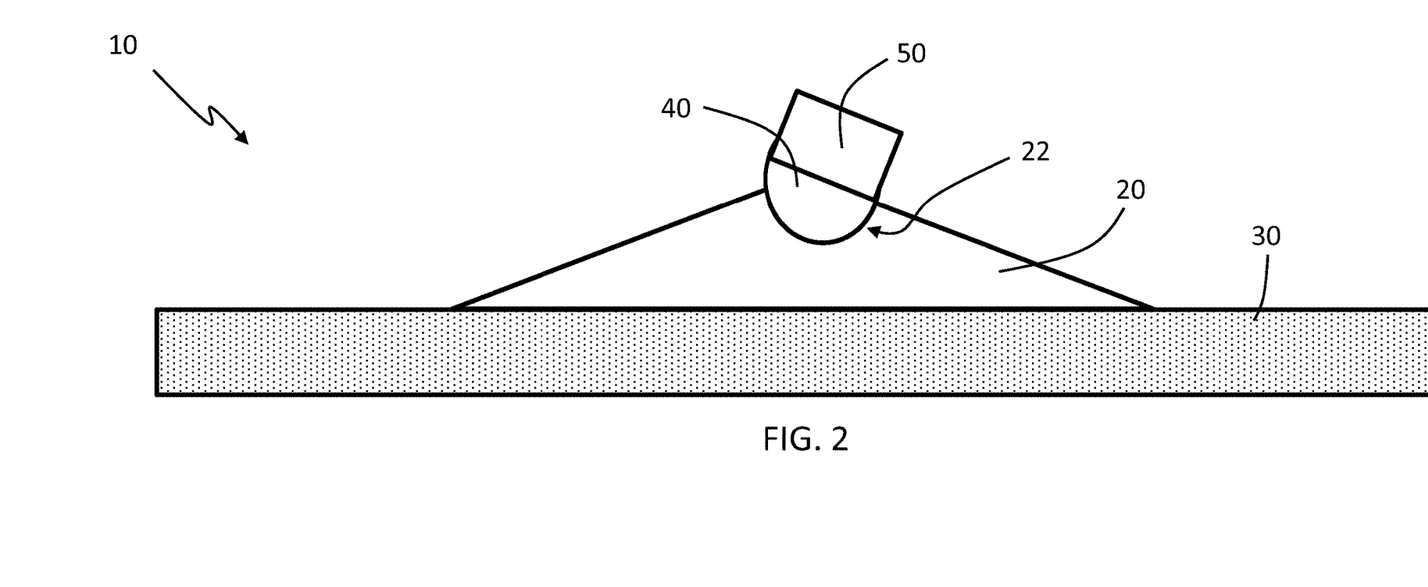
FIG. 2 is a cross-sectional illustration of the variable angle transducer interface block apparatus with an angular transducer position, in accordance with the first exemplary embodiment of the present disclosure.

While FIG. 1 illustrates the apparatus 10 in a baseline position, e.g., where the angle of the transducer 50 signal is substantially perpendicular to the planar shape of the material wall 30, the angular position of the transducer 50 can be adjusted as desired by the user. For example, FIG. 2 is a cross-sectional illustration of the variable angle transducer interface block apparatus 10 with an angular transducer 50 position, in accordance with the first exemplary embodiment of the present disclosure. As shown in FIG. 2, the transducer 50 is positioned at an angular position of approximately 22° relative to the baseline position shown in FIG. 1.

Figure 3:
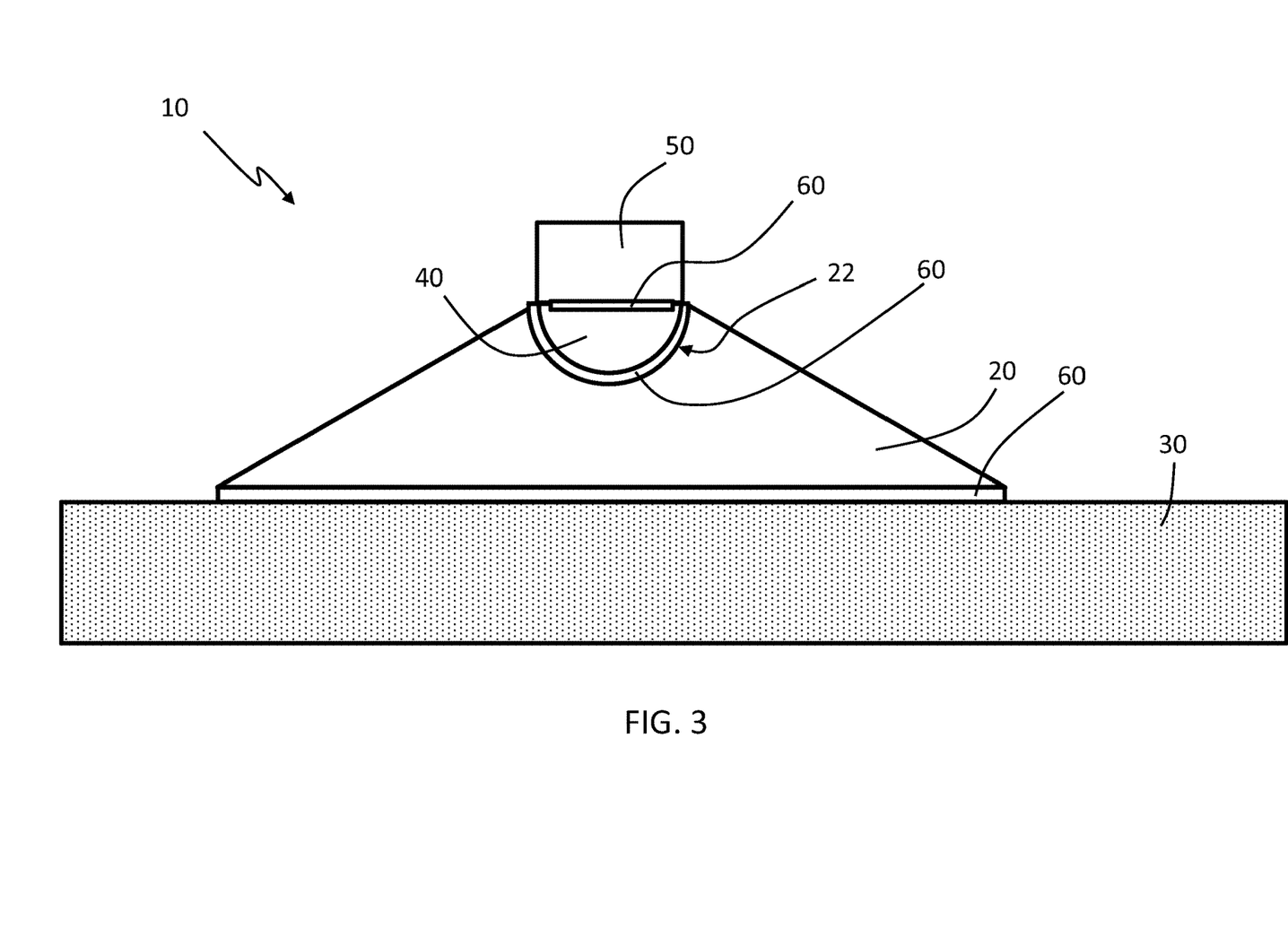
FIG. 3 is a cross-sectional illustration of the variable angle transducer interface block apparatus, in accordance with the first exemplary embodiment of the present disclosure.

FIG. 3 is a cross-sectional illustration of the variable angle transducer interface block apparatus 10, in accordance with the first exemplary embodiment of the present disclosure. As shown in FIG. 3, a couplant 60 may be used as an interface between various components of the apparatus 10. The couplant 60 may be, for example, a paste, gel, or other material which reduces the impedance difference between the various components of the apparatus 10, and in particular, between the transducer 50 and the mounting structure 40. The couplant 60 may serve as a lubricant between the structures, in particular, the movement between the mounting structure 40 and the mounting receiver 22.

Figure 4:
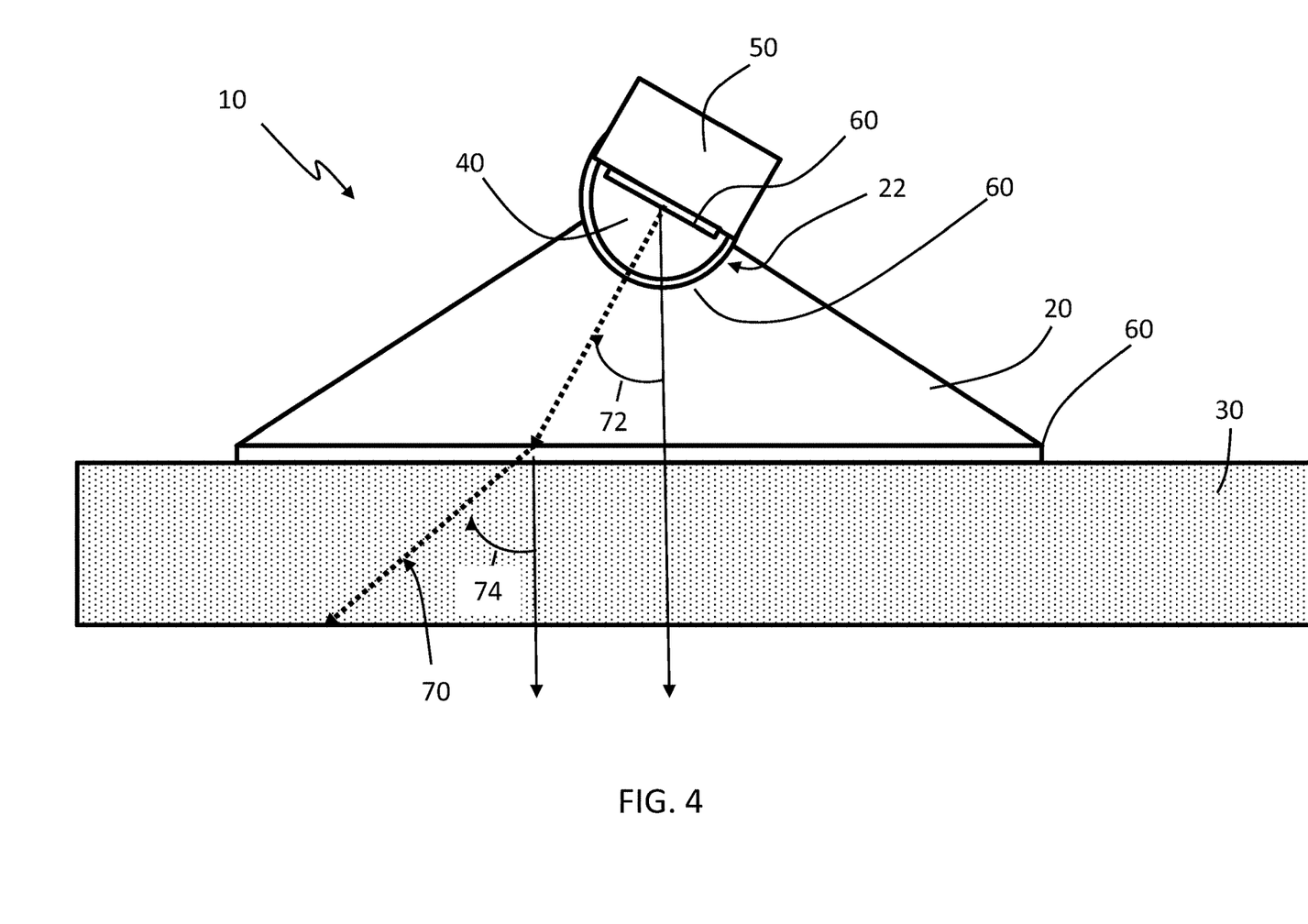
FIG. 4 is a cross-sectional illustration of the variable angle transducer interface block apparatus with an angular transducer position, in accordance with the first exemplary embodiment of the present disclosure.

FIG. 4 is a cross-sectional illustration of the variable angle transducer interface block apparatus 10 with an angular transducer 50 position, in accordance with the first exemplary embodiment of the present disclosure. As shown in FIG. 4, the transducer 50 is positioned at an approximate angle of 22° relative to the material wall 30. In this position, the transducer 50 sends an acoustic signal 70 through the curved mounting structure 40, through the interface block 20, and into the material wall 30. The angle of the acoustic signal 70, i.e., the wave angle, can be varied in pitch, yaw, or roll by moving the transducer 50 in the same manner as a joystick. As understood herein, variation in pitch may be understood as rotation about the axis coming out of the page, i.e., rotation between the left and right sides of the drawings. Variation in yaw may be understood as rotation about the axis traveling the left and right sides of the page, i.e., rotation into and out of the page. Variation in roll may be understood as rotation about the axis extending perpendicular to the interface block, i.e., twisting within the mounting receiver. The angle of the acoustic signal 70 may be adjusted in any combination of directions.

The acoustic wave created from the transducer 50 and transmitted into the mounting structure 40 travels in a known direction, in that, the direction of the signal can be calculated and understood. Specifically, in the apparatus 10, the materials which form the interface block 20, the mounting structure 40 and the couplants 60, if used, all have acoustic properties which are known. With these material properties known, the acoustic wave propagation angle 72 into the interface block 20 can be calculated and verified experimentally, such that the apparatus 10 can be used to easily adjust the wave propagation angle 74 into the material 30 to optimize the angle needed for analysis of material 30. It is noted that the surface wall of the material 30 may have various shapes, including flat, curved, or otherwise, and the apparatus 10 may be adjusted to fit to the particular shape of the material 30 surface.

Figure 5:
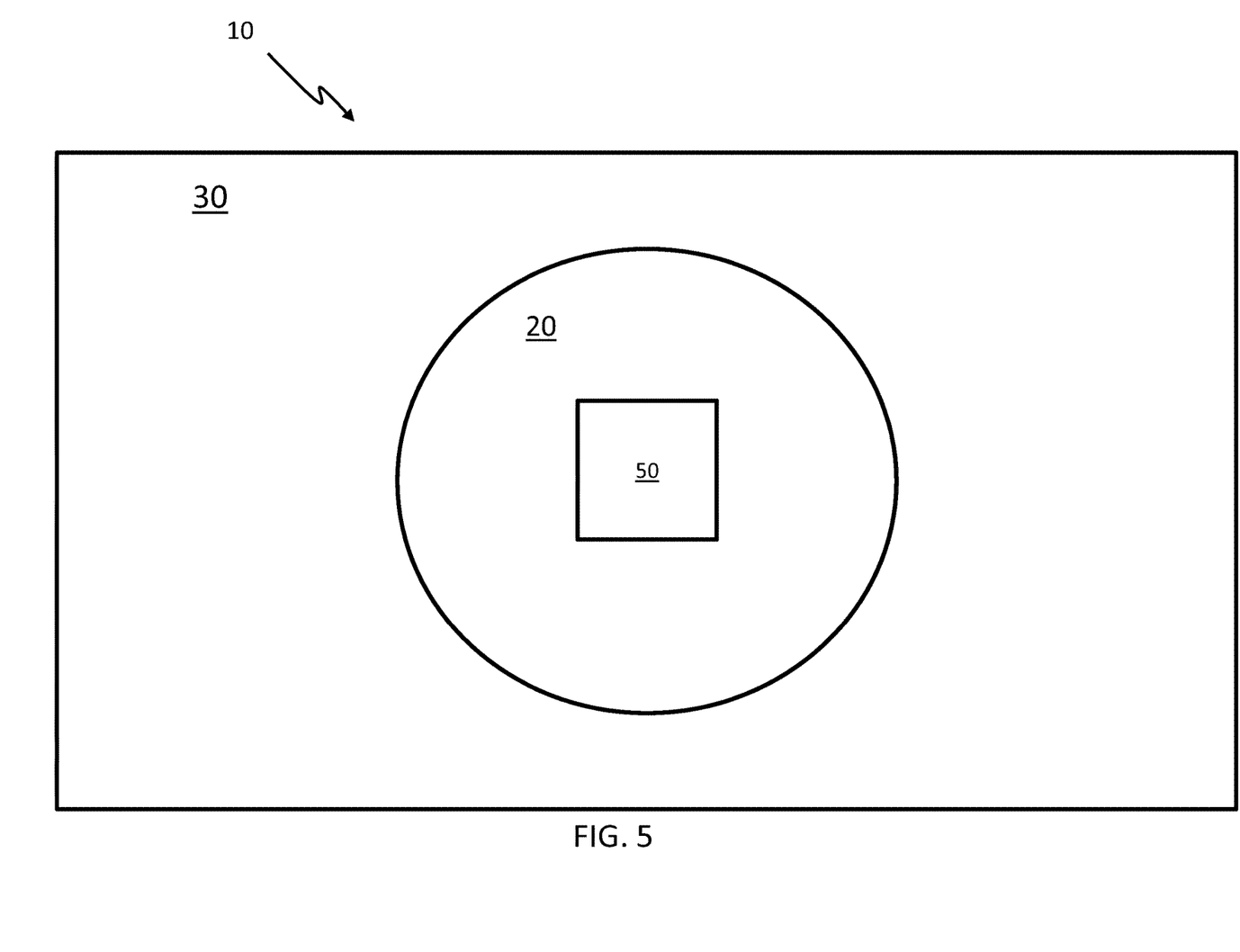
FIG. 5 is a top view illustration of the variable angle transducer interface block apparatus, in accordance with the first exemplary embodiment of the present disclosure.

FIG. 5 is a top view illustration of the variable angle transducer interface block apparatus 10, in accordance with the first exemplary embodiment of the present disclosure. As shown in FIG. 5, the top view of the apparatus 10 illustrates how the transducer 50 adjustably mounts to the interface block 20 using a mounting structure (not shown).

With reference to FIGS. 1-5 together, it is noted that the transducer 50 may be attached to the curved mounting structure 40 in a variety of ways and with a variety of devices. For example, as noted previously, a couplant may be used as an interface between the structures, which improves the acoustic signal transmission, and which may act as a lubricant. The mounting structure 40 and the mounting receiver 22 may include various types of mechanical or electro-mechanical devices to facilitate the attachment and allow adjustability of the angle. For example, the mounting structure 40 and mounting receiver 22 may use a physical restraint, such as a guide or slot system, a magnetic restraint, or other, similar restraints. This may allow for any angular movement or adjustability to be achieved, including angles between 0° and 90° relative to the material 30 surface. It is noted that the curved mounting support 40 may include a ball which is hemispherical, substantially hemispherical, or similarly curved to any degree. The mounting support 40 may also be formed as a cylinder, such that it restricts the motion of adjustment of the transducer 50 to a single axis, e.g., pitch but not yaw. The mounting support 40 may be formed from any type of material or materials.

With regards to the interface block 20, it is noted that it may be attached to the material wall 30 with a couplant. The interface block may be circular, or it may have another shape. In one example, the interface block 20 may only extend less than 360 degrees to form a portion of a truncated pyramid or truncated cone (e.g. available angles may be reduced). The signal angle may be determined leaving interface block 20, as shown in FIG. 4 by reference number 74. The signal angle 74 entering the material wall may be determined by impedance difference between material wall 30 and interface block 20. The interface block 20 may be attached to the material wall with any type of attachment or structure, such as magnetic, threaded fastener, weld, adhesive or others. It is also possible to simply place the interface block 20 on the top surface of the material wall 30, such that no attachment is needed. The available outputs of the signal include shear, long, and/or surface (inner and/or outer wall of vessel).

The movement of the mounting structure 40 relative to the interface block 20 may be manual, automated, or semi-automated. For example, a servo motor or similar device may be used to adjust the angle remotely. In one example, the angle can be interactively controlled by signal processing unit which may include an AI processing component with learning capabilities. The transducer 50 and mounting structure 40 can move in pitch and yaw directions, or in the case of mounting structures 40 which are not spherical, it is possible to have movement in a roll direction. For instance, for non-circular transducers, the roll axis may be used by spinning the transducer 50 at a given angle. If automation is used to adjust the wave angle, the movement may be driven by various objectives, such as, for example, search patterns, feedback loops, closed loops or Artificial Intelligence (AI) driven movements, flaw locations, and/or the extent of flaws in the material 30. Additionally, the movement of the transducer 50 may be controlled at predetermined angles, which are marked in various ways, such as by notches or textual markings on the interface block 20 and/or the mounting structure 40. For instance, the notches or textual markings may indicate desired measurement angles commonly in use, or at regular intervals, for example at 10°, 15°, 20°, and so on.

It may be possible to study processes in real-time which lead to measured changes in the liquid properties and have some localization characteristic that can be traced. Many of the processes may have structural components that develop over time of various shapes and sizes they occur in many industries, for example, within the chemical, food, oil and gas, medical, water management, and other industries. In one example, with flow locations, it may be possible to scan large areas of a wall by simply changing the angle of the signal that is being sent, which may be used to determine even small flaws in the wall without moving the transmitter location. It may also be possible to scan in small locations, such as between a receiver and transmitter placed in the fixed locations.

It is noted that while one transducer is disclosed relative to FIGS. 1-5, it is possible to use multiple individually or in combination with each other, where the transducers have various sizes, various wavelengths, various shapes, etc. It is also possible to use multiple types of transducers such as piezo and/or EMAT. When multiple transducers 50 are used, they may be arranged in an array of transducers. The one or more transducers 50 may support beam forming, longitudinal and shear waves, and other parameters. It is noted that transmission of a wave through distinct materials may change the wave type, such as, transmitting a wave from metal to liquid may convert shear waves into longitudinal waves. Depending on the materials inside the container, frequencies may vary substantially. In one example, it may be possible to observe aspects of the material wall 30 of the structures and concentration within the container, or observe other parameters which are more relevant. Another category of operation is accuracy of the measurement. Depending on the material of the container wall and the fluid in the container, either shear waves or longitudinal waves may be used. In other cases, it may be necessary to change the angle of the signal and, instead of using fixed wedge, it may be possible to use a variable angle transducer which can be controlled remotely or autonomously depending on the parameters of the liquid inside the container. Since the outside conditions can change the parameters controlling the properties of transmission of ultrasound waves, the angle may need to be changed as well. Additionally, the wavelengths and order of transmission, as well as timing transmission patterns, may all vary due to the current conditions, like temperature and others and material properties, and their change over time.

The apparatus 10 may be used with a variety of techniques and be used in a variety of applications, all of which are considered within the scope of the present disclosure. With fine tuning of desired angles within a material wall, it is possible to record final angle for a fixed transducer angle emplacement and then determine the correct angle for refraction within a vessel. It is also noted that the desired acoustic signal angle may be fine-tuned or varied due to the temperature, since an impedance barrier value changes due to the density on both side of the barrier, and the densities are changing non-linearly so the angle of reflection may change. The apparatus 10 can also be used to characterize material flaws within a structure, such as a vessel used for holding fluids, such as a petroleum holding tank. To find the material flaws, the apparatus 10 determines extent of the flaws by scanning multiple input angles. Correct variations in refraction/reflection angles may be needed due to environmental variability. These correction variations may be manual, manual with feedback loop, automated search, automated feedback loop, AI driven feedback loop, and/or fine tuning of propagation angle to support signal boost. It is also possible to adjust the number of reflections in a vessel for changes in material and accuracy. For example, it is possible to increase and/or decrease the number of bounces used in an acoustic flowmeter. Increase bounces may provide greater accuracy, whereas decrease bounces may provide a greater signal at the receiver.

Figure 6A:
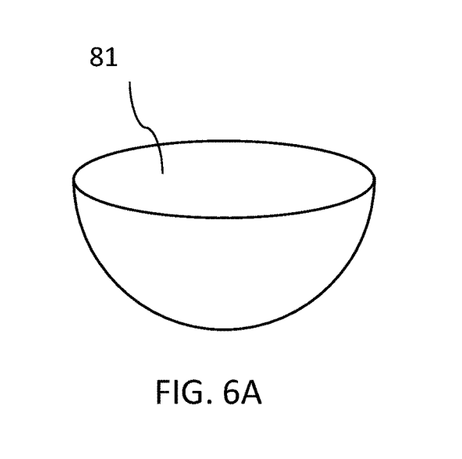
FIGS. 6A-6D are perspective illustrations of exemplary curved mounting structures, in accordance with the first exemplary embodiment of the present disclosure.
Figure 6B:
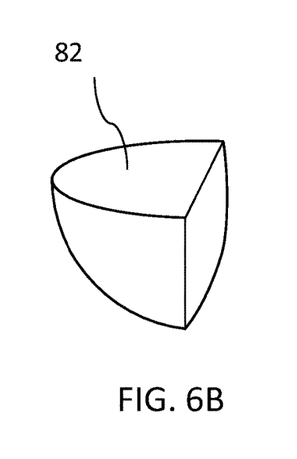

FIGS. 6A-6D are perspective illustrations of exemplary curved mounting structures 81-84, in accordance with the first exemplary embodiment of the present disclosure. FIG. 6A shows a curved mounting structure 81 having a hemispherical shape as discussed above. The hemispherical curved mounting structure 81 may rotate about pitch, yaw, and roll directions within a corresponding mounting receiver 22. FIG. 6B shows a curved mounting structure 82 having a partial hemispherical shape. This may allow the curved mounting structure 82 to rotate partially about a pitch and/or yaw direction. The mounting receiver 22 corresponding with the partial hemispherical shape may have a hemispherical shape generally. In the example shown in FIG. 6B, the curved mounting structure 82 is a quarter sphere, which may allow partial rotation in one direction of up to about 90 degrees. It should be understood that other partial hemispherical shapes are included within the scope of this disclosure, and these shapes may restrict rotation in one or more directions according to their shapes.

Figure 6C:
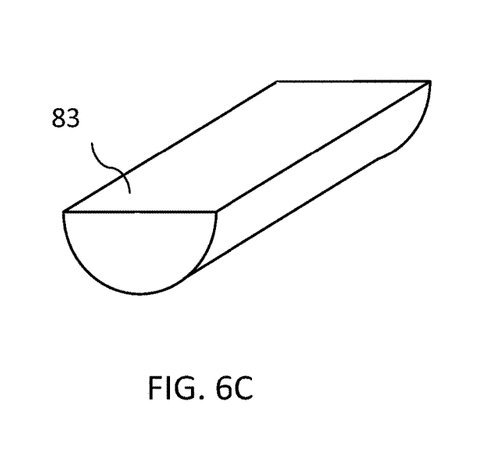
Figure 6D:
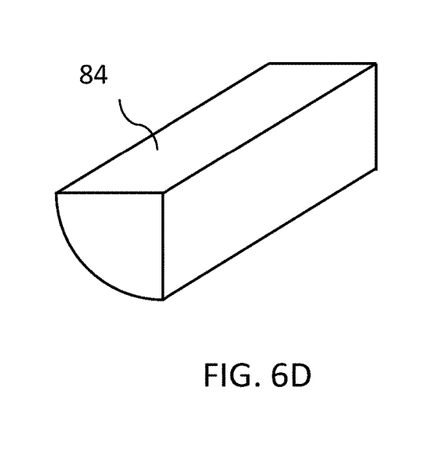

FIG. 6C illustrates a curved mounting structure 83 hemicylindrical shape. The hemicylindrical curved mounting structure 83 may rotate about a pitch direction within a corresponding mounting receiver 22. A partial hemicylindrical shape may also be used, where the curved mounting structure 83 is more or less than a true hemicylinder. FIG. 6D shows a curved mounting structure 84 having a partial hemicylindrical shape. This may allow the curved mounting structure 84 to rotate partially about the pitch direction within a hemispherical mounting receiver 22. In the example shown in FIG. 6D, the curved mounting structure 84 is a quarter cylinder, which may allow partial rotation in a pitch direction of up to about 90 degrees. It should be understood that other partial cylindrical shapes are included within the scope of this disclosure, and these shapes may restrict rotation accordingly.

FIGS. 7A-7D are perspective illustrations of exemplary interface blocks 85-88, in accordance with the first exemplary embodiment of the present disclosure. For ease of illustration, the interface blocks 85-88 are not shown with mounting receivers 22. However, it should be understood that each interface block 85-88 may include a mounting receiver 22 as described above.

Figure 7A:
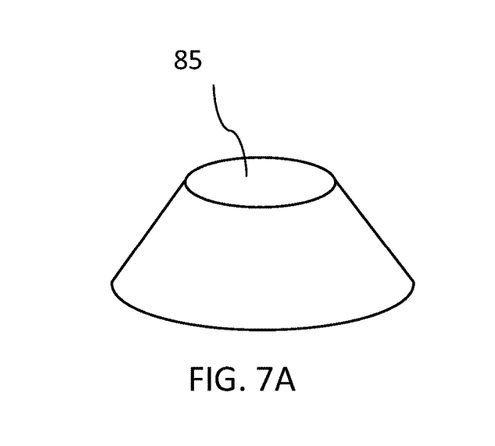
FIGS. 7A-7D are perspective illustrations of exemplary interface blocks, in accordance with the first exemplary embodiment of the present disclosure.
Figure 7B:
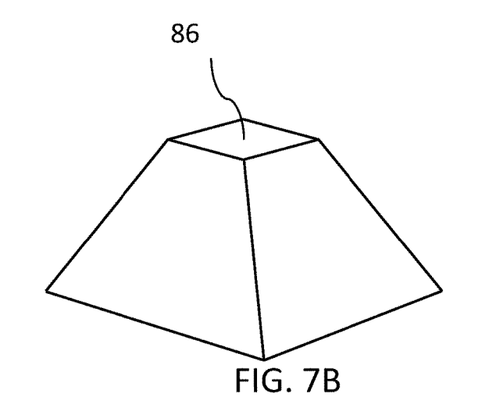
Figure 7C:
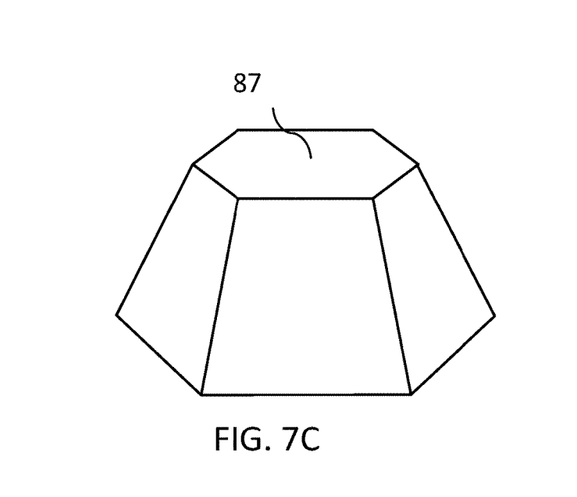
Figure 7D:
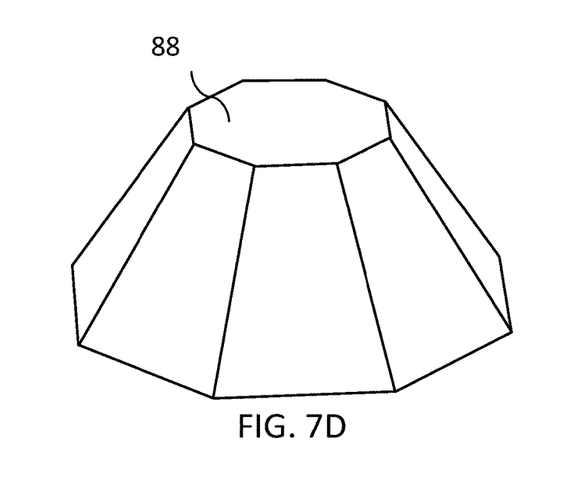

FIG. 7A shows an interface block 85 having a truncated cone shape. FIG. 7B shows an interface block 86 having a truncated quadrilateral pyramid shape. In one example, the sides of the truncated pyramid may have even length, as a square or parallelogram. In another example, the sides may have different lengths, as a rectangle, rhombus, or trapezoid. FIG. 7C shows an interface block 87 having a truncated hexagonal shape. FIG. 7D shows an interface block 88 having a truncated octagonal shape. It should be understood that the interface blocks 85-88 herein are offered as examples. Any suitable three-dimensional shape may be used for the interface block 20.

Figure 8:
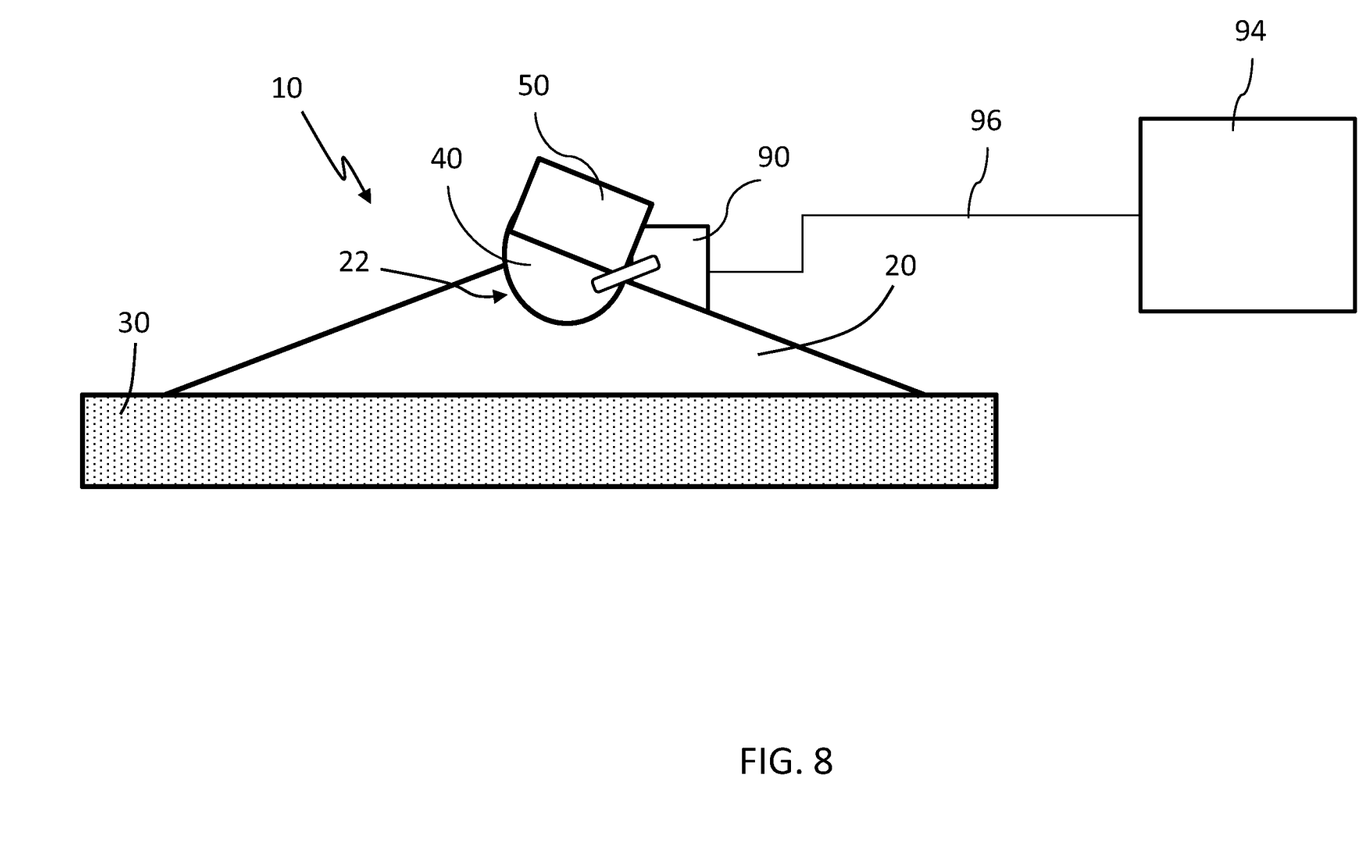
FIG. 8 is a diagrammatic illustration of the variable angle transducer interface block apparatus in operation with a computer controller, in accordance with the first exemplary embodiment of the present disclosure.

FIG. 8 is a diagrammatic illustration of the variable angle transducer interface block apparatus 10 in operation with a computer controller, in accordance with the first exemplary embodiment of the present disclosure. The apparatus 10 may understood with reference to, and may include all of the components described relative to, FIGS. 1-7D, above, including the interface block 20, mounting receiver 22, curved mounting structure 40, and transducer 50. The apparatus 10 may be positioned against or proximate to a material wall 30.

A motor 90, which may be a servo motor, piezo-electric motor, or any other suitable type of component to control and induce motion, may be in communication with the apparatus 10. In one example, the motor 90 may be in communication with the curved mounting structure 40, as shown in FIG. 8, or with the transducer 50 directly, as may be understood by one of skill in the art. The motor 90 may be mounted in a suitable location on the apparatus 10. Movement of the motor 90 may cause the position of the curved mounting structure 40 and transducer 50 to be adjusted in any combination of pitch, yaw, and roll directions, depending on the curved mounting structure 40 and the type of motor used. The motor 90 may include any typical and necessary components for operation, including an electrical power supply, mounting hardware, and the like.

In one example, a processor 94 may be in communication with the motor 90 across an electrical connection 96. The processor 94 may be any suitable processor having any suitable architecture and operating characteristics, including microcontrollers, microprocessors, embedded processors, multi-core processors, processor arrays, remote and cloud processors, and the like. The processor 94 may include any typical and necessary components for operation, such as a power supply, computer-readable memory, user interface software or hardware, network communications hardware, and the like. The processor 94 may be configured to control the movement of the transducer 50 by operating the motor 90 to adjust the position of the curved mounting structure 40. Computer software may allow a user to operate the motor 90 through a user interface. In one example, the processor 94 may be configured to adjust the angle of the acoustic signal according to a feedback loop, flaw location parameters, and flaw extent parameters.

Figure 9:
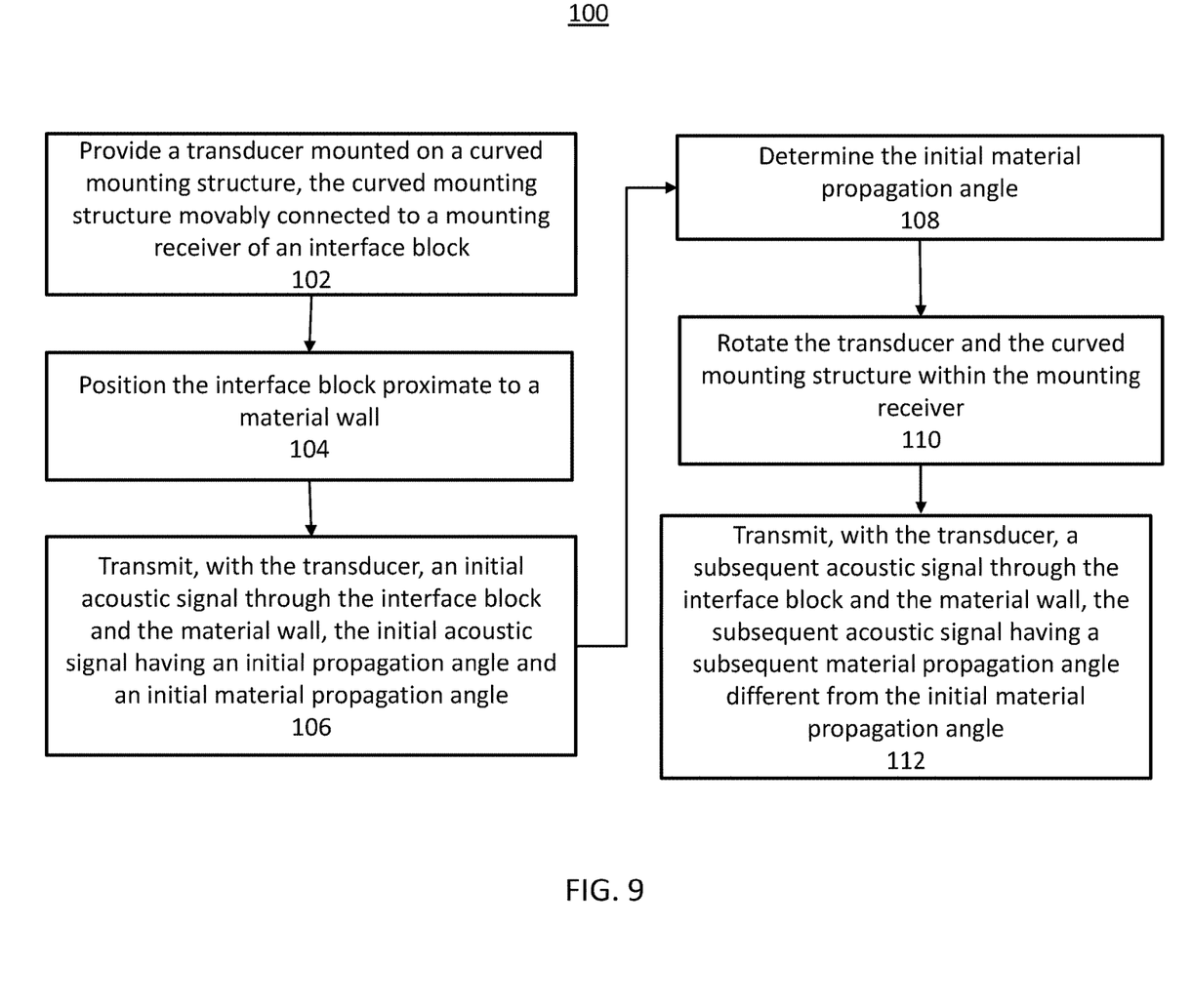
FIG. 9 is a flow chart illustrating a method of adjusting a propagation angle of an acoustic signal through a material, in accordance with the first exemplary embodiment of the present disclosure.

FIG. 9 is a flow chart 100 illustrating a method of adjusting a propagation angle of an acoustic signal through a material, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 102 includes providing a transducer mounted on a curved mounting structure, the curved mounting structure movably connected to a mounting receiver of an interface block. In one example, the mounting receiver may be shaped as a hemispherical cavity within a top end of the interface block. The shape of the curved mounting structure may correspond to the hemispherical cavity shape of the mounting receiver such that the curved mounting structure and the mounting receiver are engageable to fit together. In another example, the mounting receiver may be shaped as a hemicylindrical cavity within the top end of the interface block. The shape of the curved mounting structure may correspond to the hemicylindrical cavity shape of the mounting receiver. Depending on the shape of the mounting receiver and the curved mounting structure, the transducer and the curved mounting structure may be rotatable along any of a pitch axis, a yaw axis, and a roll axis.

In one example, the curved mounting structure may include a flat top surface. The surface area of the flat top surface may be larger than or equal to the surface area of the transducer, i.e., the mounted side of the transducer may fit completely onto the flat top surface of the curved mounting structure. This may allow the curved mounting structure an uninhibited range of rotation without the transducer contacting the sides of the interface block. In another example, the receiver of the mounting structure may be sized smaller than the curved mounting structure, such that only a radial portion of the curved mounting structure can contact the curved interior surface of the receiver. This may allow the transducer to have a wider range of motion, due to a wider spatial clearance between the receiver and the transducer.

Step 104 includes positioning the interface block proximate to a material wall. In one example, the interface block may be positioned in direct contact with the material wall. In another example, the interface block and the material wall may be placed in contact with a couplant material to ensure acoustic transfer.

Step 106 includes transmitting, with the transducer, an initial acoustic signal through the interface block and the material wall, the initial acoustic signal having an initial propagation angle and an initial material propagation angle.

Step 108 includes determining the initial material propagation angle. The initial material propagation angle may be determined by calculating the initial propagation angle of the initial acoustic signal through the interface block, based on the position and orientation of the transducer on the curved mounting structure, and correlating it with differences in the acoustic impedances of the curved mounting structure, the interface block, the material wall, and any couplants if used. In one example, the angular propagation of the acoustic signal may be based on additional factors such as the relative temperatures of the components, the frequency or wavelength of the initial acoustic signal, and other material properties.

Step 110 includes rotating the transducer and the curved mounting structure within the mounting receiver. In one example, the transducer and the curved mounting structure may be rotated manually. In another example, a motor may be in communication with the transducer and/or the curved mounting structure to rotate the transducer and the curved mounting structure. The motor may be operated by physical controls, such as buttons, switches, dials, and the like, or by digital controls. In one example, the digital controls may be operated by a processor in communication with the motor. The processor may be configured to control the movement of the transducer by operating the motor to adjust the position of the curved mounting structure. Computer software may allow a user to operate the motor through a user interface. In one example, the processor may be configured to adjust the angle of the acoustic signal according to a feedback loop, flaw location parameters, and flaw extent parameters.

Step 112 includes transmitting, with the transducer, a subsequent acoustic signal through the interface block and the material wall, the subsequent acoustic signal having a subsequent material propagation angle different from the initial material propagation angle. The subsequent propagation angle may be determined using the same procedure described in Step 108. The subsequent acoustic signal may propagate at an angle different from the initial acoustic signal through the material wall, which may in turn cause the subsequent acoustic signal to interact with a different aspect of the material wall.

In one example, the process may be repeated through one or more iterative processes to determine a desired propagation angle for a fixed transducer angle emplacement, to determine an optimal angle for acoustic refraction within the material wall, or to discover other angles having desired properties. In another example, the process may be repeated to discover and characterize material flaws in the material wall. For instance, the initial and subsequent acoustic signals may be received by an acoustic sensor, which may record the intensity and other wave characteristics of the acoustic signals. The acoustic sensor may be in electrical communication with a processor configured to analyze the received acoustic signals. Data recorded by the acoustic sensor and processor may be analyzed to determine the location, type, size, and extent of flaws in the material. In another example, the initial and subsequent acoustic signals may be received and analyzed to determine variations in refraction or reflection angles at the material wall interface caused by environmental conditions. In still another example, the initial and subsequent acoustic signals may be received and analyzed to measure and optimize the number of bounces in the material.

While the disclosure herein has described the subject invention with acoustic waves, it may be possible, in certain circumstances, to use other types of waves in place of acoustic waves. For instance, it may be possible in some situations to use any non-intrusive and non-destructive wave form, such as radiological, optical, magnetic, or others.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A variable angle transducer interface block apparatus comprising:
    an interface block having a mounting receiver, the interface block positioned proximate to a material wall;
    a curved mounting structure movably connected to the mounting receiver, wherein the mounting receiver is shaped as a hemispherical cavity within a top end of the interface block;
    a transducer mounted on the curved mounting structure, wherein an angle of an acoustic signal transmitted by the transducer into the material wall is adjustable by movement of the curved mounting structure relative to the mounting receiver; and
    a motor in communication with the curved mounting structure to adjust the angle of the acoustic signal.

2. The variable angle transducer interface block apparatus of claim 1, wherein the interface block is shaped as a truncated cone having a base and a top end, wherein the base is positioned proximate to the material wall, and wherein the top end comprises the mounting receiver.

3. The variable angle transducer interface block apparatus of claim 1, wherein the interface block is in direct contact with the material wall.

4. The variable angle transducer interface block apparatus of claim 1, further comprising a couplant material between the interface block and at least one from the set of: the material wall and the curved mounting structure.

5. The variable angle transducer interface block apparatus of claim 1, wherein a shape of the curved mounting structure corresponds to the hemispherical cavity shape of the mounting receiver.

6. The variable angle transducer interface block apparatus of claim 1, wherein the curved mounting structure comprises a flat top surface, and wherein a surface area of the flat top surface is at least as large as a surface area of the transducer mounted on the curved mounting structure.

7. The variable angle transducer interface block apparatus of claim 1, further comprising an array of transducers mounted on the curved mounting structure, wherein the transducers are configured to generate at least one from the set of: beam formed waves, longitudinal acoustic waves, and shear acoustic waves.

8. The variable angle transducer interface block apparatus of claim 1, further comprising a processor in communication with the motor and configured to control the motor, thereby adjusting the angle of the acoustic signal.

9. The variable angle transducer interface block apparatus of claim 8, wherein the angle of the acoustic signal is adjusted according to one from the set of: a search pattern, a feedback loop, flaw location parameters, flaw extent parameters, a temperature change at an impedance barrier, and without adjusting a position or angle of a receiving transducer.

10. The variable angle transducer interface block apparatus of claim 1, wherein the transducer is a piezo transducer or an EMAT transducer.

11. A method of adjusting a propagation angle of an acoustic signal through a material, comprising the following steps:
    providing a transducer mounted on a curved mounting structure, the curved mounting structure movably connected to a mounting receiver of an interface block, wherein the mounting receiver is shaped as a hemispherical cavity within a top end of the interface block, and wherein a shape of the curved mounting structure corresponds to the hemispherical cavity shape of the mounting receiver;
    positioning the interface block proximate to a material wall;
    transmitting, with the transducer, an initial acoustic signal through the interface block and the material wall, the initial acoustic signal having an initial propagation angle and an initial material propagation angle;
    determining the initial material propagation angle;
    rotating the transducer and the curved mounting structure within the mounting receiver using a motor in communication with the curved mounting structure to adjust at least one of the initial propagation angle or the initial material propagation angle of the initial acoustic signal; and
    transmitting, with the transducer, a subsequent acoustic signal through the interface block and the material wall, the subsequent acoustic signal having a subsequent material propagation angle different from the initial material propagation angle.

12. The method of claim 11, wherein the transducer and curved mounting structure are rotatable along at least one from the set of: a pitch axis, a yaw axis, and a roll axis.

13. The method of claim 11, wherein the curved mounting structure comprises a flat top surface, and wherein a surface area of the flat top surface is at least as large as a surface area of the transducer mounted on the curved mounting structure.

* * * * *